F. E. KENDRICK.
FLY SWATTER.
APPLICATION FILED SEPT. 15, 1914.
1,146,332.
Patented July 13, 1915.
2 SHEETS—SHEET 2.
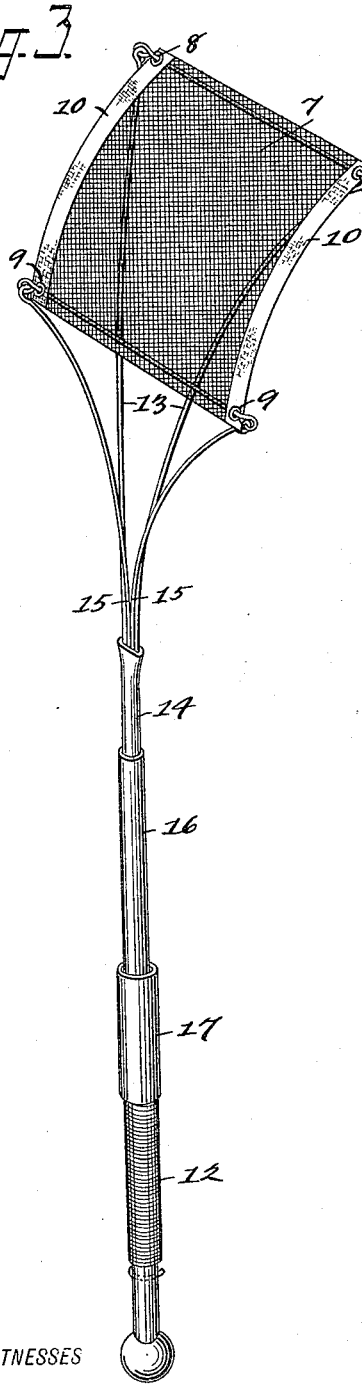
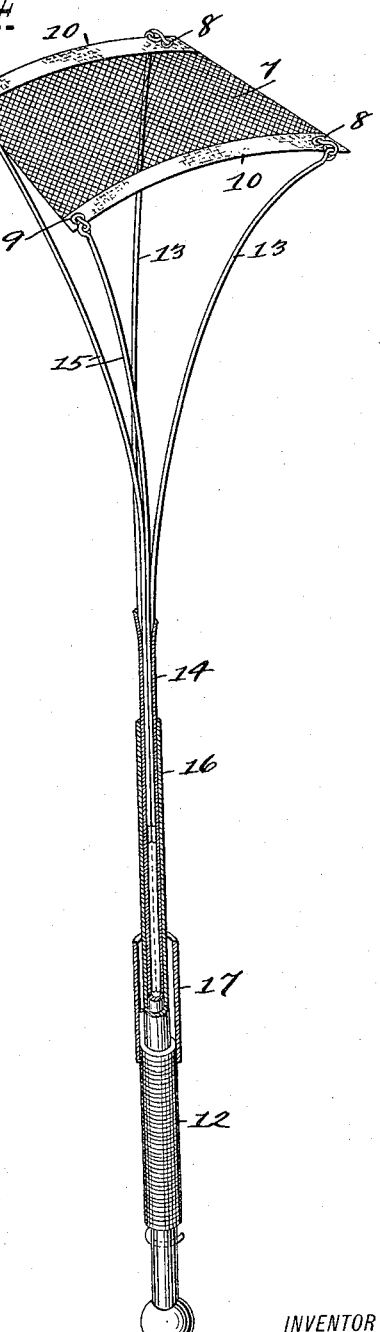
INVENTOR
Frank E. Kendrick
BY
ATTORNEYS
WITNESSES

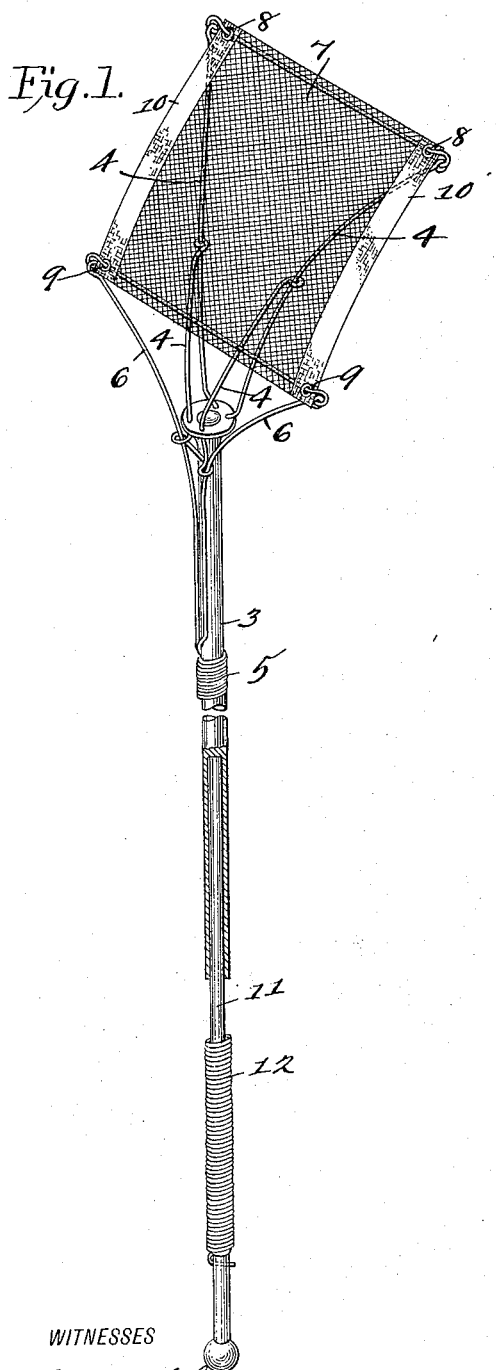

UNITED STATES PATENT OFFICE.

FRANK EDWIN KENDRICK, OF PHILLIPSBURG, NEW JERSEY.

FLY-SWATTER.

1,146,332.  Specification of Letters Patent.  Patented July 13, 1915.

Application filed September 15, 1914. Serial No. 861,780.

*To all whom it may concern:*

Be it known that I, FRANK E. KENDRICK, a citizen of the United States, and a resident of Phillipsburg, in the county of Warren and State of New Jersey, have invented certain new and useful Improvements in Fly-Swatters, of which the following is a specification.

My invention relates to the extermination of insects, such as flies, mosquitos, and the like, and the main object thereof is to provide one device adapted for use as a manually operable swatter on low levels and also for use upon ceilings of rooms, the handle rod being made extensible and collapsible in order to adapt the device to such uses, and a further object is to provide means for mechanically actuating the device at will, in impulses destructive to the insects, this being of particular advantage when the insect is in a position not permitting the swing necessary in the use of the conventional swatter, although my device may also be used the same as the said conventional form.

My invention is fully described in the following specification, of which the accompanying drawings form a part, in which the same parts are designated by the same reference characters in each of the views, and in which:—

Figure 1 is a perspective view of my invention in position for use as a swatter in low and convenient places; Fig. 2 is a similar view thereof, in position for use as a mechanical swatter, on ceilings or other places, not readily accessible; Fig. 3 is a view similar to Fig. 1, but showing a simplification thereover; and Fig. 4 is a view of said modification in the position shown in Fig. 2.

In Figs. 1 and 2 of the drawings I have shown one form of my invention, comprising a rod 3 provided with fixed arms 4 at the top thereof, a longitudinally slidable sleeve 5 having arms 6 connected therewith, and a section of wire mesh 7 having eyelets 8 in the upper corners thereof for engagement with the arms 4, and eyelets 9 in the lower corners thereof for engagement with the arms 6, and it will be seen that, if the sleeve 5 be moved upwardly along the rod 3, the wire mesh or screen 7 is moved into a position approximately perpendicular to the rod 3, thus adapting the device for contact with a ceiling, and I turn the edges 10 of the screen over twice to stiffen it and to prevent injury to the surface upon which an insect may be resting.

I prefer to telescope a rod 11 within the rod 3, in which event I will provide a tube for the latter instead of a solid rod, whereby the device may be employed at either long or short range; I also provide a relatively strong coil spring 12, the lower end of which is connected with the lower end of the rod 11, and the upper end of which is free, and it will be seen that, if the upper end of the coil spring be grasped by one hand of an operator, and the lower end of the rod 11 be grasped by the other hand and retracted and suddenly released, a simple form of catapult results, the screen 7 coming into sharp contact with a ceiling or other surface against which it is directed, thereby killing or stunning an insect beneath the screen.

The form shown in Figs. 3 and 4 is much simpler than that described and may be made much more cheaply, although no more efficient; it comprises the same screen 7 having the holes 8 and 9, in the former of which are connected two rods 13 extended a desired distance in to a tube 14 and preferably fixed therein, and in the latter are connected rods 15 also passed into the tube 14 but slidable therein, and I flatten the upper end of this tube in order to bring all of said rods in line with each other, with the rods 15 between the rods 13, whereby they may be readily grasped to move the screen 7 into any desired inclination with respect to the tube 14. The tube 14 is telescoped within a tube 16 which serves as the handle of the device, and in the lower part of which is secured the lower end of the coil spring 12, a sleeve 17 being secured to the upper end of said spring and serves as a handle for the catapult action of the device.

It will thus be seen that either form of my device may be quickly and easily arranged for either of two uses, as an ordinary swatter with the screen at any desired angle with respect to the handle, or as a catapult, and having a handle adjustable to any desired length; it is nearly as simple in construction as the conventional swatters but possesses the very material advantage thereover of enabling a person to reach an insect upon a ceiling or other surface inaccessible to the ordinary swatter, and immune therefrom.

While I have shown and described certain structural details, it will be obvious that I do not limit myself thereto, but may make changes thereover, within the scope of the following claim, without departing from the spirit of my invention, or sacrificing its advantages.

It will be noted that the screen is freely flexible by reason of the fact that I provide no frame therefor and that it is of greater length than the normal distance between the respective supporting rods, this flexibility of the screen between supports causing the same to belly downward in the outward movement of the supports thereof by means of the coil spring and, when the outer ends of the rods impact with the surface upon which an insect rests, the center of the screen flies forward and merely stuns the insect instead of mashing it and staining the wall or other surface.

Having fully described my invention, what I claim as new, and desire to secure by Letters Patent, is:—

A device of the class described, comprising a handle, swinging arms fixedly connected therewith, two supplemental arms slidably connected therewith, and a screen of wire mesh in hinged connection with said arms, said screen being outwardly bowed with respect to said handle and said arms being flexible to permit said screen to be forced into a plane, upon impact thereof with a surface.

In testimony whereof I have signed my name to this specification in the presence of two subscribing witnesses.

FRANK EDWIN KENDRICK.

Witnesses:
 BENJ. B. METZ,
 J. V. METZ.

Copies of this patent may be obtained for five cents each, by addressing the "Commissioner of Patents. Washington, D. C."